(12) United States Patent
Kajino et al.

(10) Patent No.: US 8,213,288 B2
(45) Date of Patent: Jul. 3, 2012

(54) OPTICAL INFORMATION REPRODUCING APPARATUS, INFORMATION REPRODUCING METHOD OF OPTICAL INFORMATION REPRODUCING APPARATUS, PROGRAM AND RECORDING MEDIUM

(75) Inventors: Osamu Kajino, Osaka (JP); Hidenori Wada, Kyoto (JP); Haruhisa Yagi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/995,274

(22) PCT Filed: Aug. 26, 2009

(86) PCT No.: PCT/JP2009/004141
§ 371 (c)(1),
(2), (4) Date: Feb. 7, 2011

(87) PCT Pub. No.: WO2010/023905
PCT Pub. Date: Mar. 4, 2010

(65) Prior Publication Data
US 2011/0138405 A1 Jun. 9, 2011

(30) Foreign Application Priority Data
Aug. 28, 2008 (JP) ................................. 2008-219175

(51) Int. Cl.
*G11B 7/00* (2006.01)
(52) U.S. Cl. ......................... 369/116; 369/94; 369/47.52
(58) Field of Classification Search .................. 369/116, 369/47.51, 47.42, 47.54, 94, 44.25, 44.26, 369/53.22, 47.27
See application file for complete search history.

(56) References Cited

U.S. PATENT DOCUMENTS

| 7,969,838 B2 * | 6/2011 | Kikugawa | 369/47.28 |
| 8,111,599 B2 * | 2/2012 | Furumiya | 369/47.49 |
| 2005/0201434 A1 | 9/2005 | Tatsuta | |
| 2005/0286392 A1 | 12/2005 | Kamei | |

FOREIGN PATENT DOCUMENTS

| JP | 11-003550 | 1/1999 |
| JP | 2004-110975 A | 4/2004 |
| JP | 2004-355723 A | 12/2004 |
| JP | 2005-259285 A | 9/2005 |
| WO | WO 2004/038711 A1 | 5/2004 |

OTHER PUBLICATIONS

International Search Report for International Application No. PCT/JP2009/004141, Oct. 6, 2009, Panasonic Corporation.

\* cited by examiner

*Primary Examiner* — Nabil Hindi
(74) *Attorney, Agent, or Firm* — RatnerPrestia

(57) ABSTRACT

A deterioration of reproduction light is occurred by a laser drive current on which a high-frequency current is superimposed. The present invention, for example, is an optical information reproducing apparatus which irradiates a laser beam to an optical disc 1 and reads an information, the optical information reproducing apparatus includes a semiconductor laser 6 which generates the laser beam, a laser drive unit 7 which supplies a drive current on which a high-frequency current are superimposed to the semiconductor laser 6, a spindle motor 2 which drives the optical disc 1 and a control unit 5 which controls the laser drive unit 7 and the spindle motor 2, and the control unit 5 determines a parameter of the high-frequency current based on magnitude of a current on which the high-frequency current is to be superimposed.

12 Claims, 6 Drawing Sheets

OPTICAL INFORMATION REPRODUCING APPARATUS, INFORMATION REPRODUCING METHOD OF OPTICAL INFORMATION REPRODUCING APPARATUS, PROGRAM AND RECORDING MEDIUM

This Application is A U.S. National Phase Application of PCT International Patent Application No. PCT/JP2009/004141 filed Aug. 26, 2009, claiming the benefit of priority of Japanese Patent Application No. 2008-219175 filed Aug. 28, 2008, all of which are incorporated by reference herein in their entirety.

Technical Field

The present invention relates to an optical information reproducing apparatus which has at least a function for reproducing information recorded on an information recording medium by a laser beam and laser driving device having a high frequency superimposition mechanism for reducing laser noise, and a method for reproducing thereof.

Background Art

In recent years, a tendency of high-speed record/reproduction (tendency of high-speed) for an optical information reproducing apparatus which performs record and reproduction in a high-density on an optical recoding medium such as BD (a Blu-ray Disc) progresses and also a tendency of high-power with respect to a semiconductor laser progresses.

On the other hand, in case of the optical information reproducing apparatus which performs recording and reproducing information by using the semiconductor laser, the laser beam output from the semiconductor laser is irradiated to the rotating information recoding medium, and a reflected light from the information recoding medium is received to reproduce the information. However, such an apparatus has a problem that the quality of reproduced information is deteriorated because a portion of the reflected light retunes to the semiconductor laser, so that the noise is mixed into the laser beam. Especially, the problem is caused when reproduction operation is performed with low output.

As a result of this, the high power and the low noise at the low power are simultaneously requested with respect of the .semiconductor laser.

A method of superimposing a high-frequency current on a DC current for driving the semiconductor laser is known as a method of suppressing the noise caused by this returned light.

FIG. 6 is a block diagram of a conventional optical information reproducing apparatus (an optical disc drive) (see JP2004-110975).

An optical disc drive 51 comprises an unillustrated .semiconductor laser and an optical detector, irradiates laser beam generated by the semiconductor laser to an information recoding medium 52 (disc), receives a reflected light from the disc 52 by using the optical detector and converts the information recorded on the disc 52 into the electric signal. The converted electric signal is converted into digital data by using an unillustrated signal LSI, however, a portion of the reflected light retunes to the semiconductor laser, so that the noise is mixed into the laser beam and then .the jitter of reproduced information is degraded.

In order to improve this matter, a LD driver 53 comprises a function of superimposing a high-frequency component with a predetermined frequency and a predetermined amplitude value on a drive current when the drive current is supplied to the .semiconductor laser. A single-mode laser can be thereby changed into a multi-mode laser to suppress the jitter. The level of suppressed noise by superimposing the high-frequency current is changed by the frequency and amplitude of the high-frequency which are set by register 54 disposed in the LD drive 53. Therefore, the frequency and amplitude are searched and set at which the jitter becomes the smallest while the jitter is measured by a jitter measuring unit 55

In general, an optimum frequency and amplitude at which the jitter becomes the smallest is different according to the individual difference of the optical disc drive 51. However, since the optimum frequency and amplitude are set while the jitter is measured, the optimum value without any error can be set with respect to each optical disc drive.

Prior Art Document

Patent Document

Patent Document 1: Japanese Patent Laid-Open No. 2004-110975

SUMMARY OF INVENTION

Problems to be Solved by the Invention

However, there were some problems as described below, in the above described conventional structure.

The frequency and amplitude of the superimposed high-frequency current have been set so that they become the optimum value with respect to only the jitter. Therefore, when the disc 52 is not read-only type and is the recordable type, the reproduction of the disc 52 is performed under the condition in which the amplitude value of the drive current on which the high-frequency current is superimposed is larger than the predetermined value. In that case, damage may be caused to information recorded on the recording medium by the laser beam.

The reason is that when the semiconductor laser is driven by the drive current on which the high-frequency current is superimposed, the waveform of the intensity of the laser beam becomes the waveform having a remarkable high and sharp peak partially compared with the mean level, so that deterioration of reproduction light that the recorded information is deteriorated by the peak points of intensity of the laser beam occurs.

Especially, the deterioration of reproduction light is caused easily further more, because that the quantities of light at the reproduction increases as the tendency of high-speed record/reproduction progresses in recent years.

Meanwhile, there is a problem that the deterioration of reproduction light can not be prevented while the jitter is being suppressed, because the jitter at a low-speed reproduction deteriorates when the superimposed amplitude is set small too much in order to prevent the deterioration of reproduction light at a high-speed reproduction.

An object of the present invention is to provide an optical information reproducing apparatus, an information reproducing method of an optical information reproducing apparatus, a program and a recording medium, which can suppress occurrence of the damage to the information recorded on a recording medium due to the laser beam and has a high reliability.

Means for Solving the Problems

The 1$^{st}$ aspect of the present invention is an optical information reproducing apparatus which irradiates a laser beam to an information recording medium and reads an information, said optical information reproducing apparatus comprising:

a semiconductor laser which generates said laser beam;

a laser drive unit which supplies a drive current on which a high-frequency current is superimposed to said semiconductor laser;

a spindle motor which drives said information recording medium; and a control unit which controls said laser drive unit and said spindle motor, wherein said control unit determines a parameter of said high-frequency current based on magnitude of a current on which said high-frequency current is to be superimposed.

The $2^{nd}$ aspect of the present invention is the optical information reproducing apparatus according to the $1^{st}$ aspect of the present invention, wherein said control unit has at least one of a function of determining a reproduction speed for reading out information from said information recording medium and a function of identifying a type of said information recording medium, said magnitude of said current on which said high-frequency current is to be superimposed is determined based on at least one information of i) said type of said information recording medium identified by said control unit, ii) said reproduction speed determined by said control unit and iii) reproduction layer information indicating which one of information recording surfaces on said information recording medium is reproduced.

The $3^{rd}$ aspect of the present invention is the optical information reproducing apparatus according to the $2^{nd}$ aspect of the present invention, wherein said control unit has said function of determining a reproduction speed and said function of identifying a type of said information recording medium, said parameter of said high-frequency current is determined based on said identified type of said information recording medium and said determined said reproduction speed, said determined said parameter of said high-frequency current includes an amplitude set value which sets an amplitude value of said high-frequency current and a frequency set value which sets a frequency of said high-frequency current, which are used at said laser drive unit.

Accordingly, for example, since the parameter of the high-frequency current is determined according to the type and reproduction speed of the information recording medium, an optical information reproducing apparatus which can prevent the deterioration of reproduction light and can perform the reproduction with the suppressed jitter can be provided.

Also, for example, an optical information reproducing apparatus of the present invention may identify that the type of the information recording medium is either the read-only type, write-once type or rewritable type, and may determine the parameter of the high-frequency current based on the result of the identification.

Accordingly, for example, an optical information reproducing apparatus which can prevent the deterioration of reproduction light regardless of the type of the information recording medium can be provided.

The $4^{th}$ aspect of the present invention is the optical information reproducing apparatus according to the $3^{rd}$ aspect of the present invention, wherein said parameter of said high-frequency current is set so that a ratio of a peak level value and an average level value of a light intensity of said laser beam is equal to or less than a predetermined value.

The $5^{th}$ aspect of the present invention is the optical information reproducing apparatus according to the $4^{th}$ aspect of the present invention, wherein said predetermined value is a threshold value which does not cause damage to recorded information on said information recording medium by said laser beam when said information recording medium is reproduced.

The $6^{th}$ aspect of the present invention is the optical information reproducing apparatus according to the $5^{th}$ aspect of the present invention, wherein said predetermined value differs depending on said type of said information recording medium, said reproduction speed, or which information recording surface of said information recording medium is reproduced.

Accordingly, for example, an optical information reproducing apparatus which can prevent the deterioration of reproduction light regardless of the type of the information recording medium, reproduction speed of the information recording medium or the information recording surface which is to be reproduced can be provided.

The $7^{th}$ aspect of the present invention is the optical information reproducing apparatus according to any one of the $4^{th}$ to the $6^{th}$ aspects of the present inventions, comprising;

a storage unit which stores said parameter of said high-frequency current, said parameter being set in advance, wherein said parameter of said high-frequency current is selectively read out from said storage unit based on a result of identifying said type of said information recording medium and said determined reproduction speed.

Accordingly, for example, an optical information reproducing apparatus which does not need the learning at the time of the start and has a short rising time can be provided.

The $8^{th}$ aspect of the present invention is the optical information reproducing apparatus according to the $4^{th}$, the $6^{th}$ or the $7^{th}$ aspects of the present inventions, wherein said parameter of said high-frequency current is set so that said ratio of a peak level value and a average level value of a light intensity of said laser beam becomes smaller in the case of said information recording medium being a recordable type than in the case of said information recording medium being a read-only type.

Accordingly, for example, an optical information reproducing apparatus which prevents the deterioration of reproduction light and can perform the reproduction with the suppressed jitter with respect to the recording medium of the read-only type without the deterioration of reproduction light can be provided.

The $9^{th}$ aspect of the present invention is the optical information reproducing apparatus according to the $4^{th}$, the $6^{th}$ or the $7^{th}$ aspects of the present inventions, wherein said parameter of said high-frequency current is set so that said ratio of a peak level value and a average level value of a light intensity of said laser beam becomes smaller in the case of said information recording medium being a rewritable type than in the case of said information recording medium being a write-once type.

Accordingly, for example, an optical information reproducing apparatus which prevents the deterioration of reproduction light and can perform the reproduction with the suppressed jitter with respect to the recording medium of the write-once type can be provided.

The $10^{th}$ aspect of the present invention is the optical information reproducing apparatus according to the $8^{th}$ or the $9^{th}$ aspects of the present inventions, wherein an amplitude of said high-frequency current, which is set in advance with respect to said read-only type or said write-once type, is smaller than an amplitude of said high-frequency current, which is set in advance with respect to said recordable type or said rewritable type.

Accordingly, for example, an optical information reproducing apparatus which can lower the peak level of the light intensity and can prevent the deterioration of reproduction light can be provided.

The 11$^{th}$ aspect of the present invention is the optical information reproducing apparatus according to the 8$^{th}$ or the 9$^{th}$ aspects of the present inventions, wherein a frequency of said high-frequency current, which is set in advance with respect to said read-only type or said write-once type, is smaller than a frequency of said high-frequency current, which is set in advance with respect to said recordable type or said rewritable type.

Accordingly, for example, an optical information reproducing apparatus which can lower the peak level of the light intensity and can prevent the deterioration of reproduction light can be provided.

The 12$^{th}$ aspect of the present invention is the optical information reproducing apparatus according to the 7$^{th}$ aspect of the present invention, wherein said amplitude set value which is included in said parameter of said high-frequency current stored by said storage unit is set in advance so that a predetermined amplitude is obtained, and the other amplitude set value is calculated by using said amplitude set value stored by said storage unit.

Accordingly, for example, an optical information reproducing apparatus in which the smallest amplitude set value having a small effect of suppressing the jitter is accurately set to lower influence of the set error and which reduces the number of setting steps of the other set values to be able to realize low cost can be provided.

The 13$^{th}$ aspect of the present invention is the optical information reproducing apparatus according to the 4$^{th}$ aspect of the present invention, wherein said control unit changes said determined parameter when said reproduction speed is changed during reproduction of said information recorded on said information recording medium or said information recording surface to be reproduced is changed.

Accordingly, for example, since the parameter of the high-frequency current is changed according to the change of the reproduction speed of the information recording medium or the change of the information recording surface which is to be reproduced, an optical information reproducing apparatus which can prevent the deterioration of reproduction light and can perform the reproduction with the suppressed jitter can be provided.

The 14$^{th}$ aspect of the present invention is the optical information reproducing apparatus according to the 13$^{th}$ aspect of the present invention, wherein when said reproduction speed is changed in an increase direction during reproduction of said information recorded on said information recording medium which is recordable, said average level value of said light intensity of said laser beam is increased after said parameter of said high-frequency current is changed.

Accordingly, for example, an optical information reproducing apparatus which can prevent the deterioration of reproduction light even when the reproduction speed is increased during reproduction operation can be provided.

The 15$^{th}$ aspect of the present invention is the optical information reproducing apparatus according to the 13$^{th}$ aspect of the present invention, wherein when said reproduction speed is changed in a decrease direction during reproduction of said information recorded on said information recording medium which is recordable, said parameter of said high-frequency current is changed after said average level value of said light intensity of said laser beam is decreased.

Accordingly, for example, an optical information reproducing apparatus which can prevent the deterioration of reproduction light even when the reproduction speed is decreased during reproduction operation can be provided.

Also, in case of an optical information reproducing apparatus of the present invention, an oscillation wavelength of the semiconductor laser may be 390 nm or more and 450 nm or less.

Accordingly, for example, an optical information reproducing apparatus which can prevent the deterioration of reproduction light even when the reproduction of the information recording medium is performed in high-density by the laser beam with the wavelength range of 390 nm or more and 450 nm or less can be provided.

The 16$^{th}$ aspect of the present invention is an information reproducing method of an optical information reproducing apparatus which irradiates a laser beam to an information recording medium and reads an information, said optical information reproducing apparatus having;

(i) a semiconductor laser which generates said laser beam;

(ii) a laser drive unit which supplies a drive current on which a high-frequency current is superimposed to said semiconductor laser;

(iii) a spindle motor which drives said information recording medium; and (iv) a control unit which controls said laser drive unit and said spindle motor, wherein said information reproducing method comprises a step in which said control unit determines a parameter of said high-frequency current based on magnitude of a current on which said high-frequency current is to be superimposed.

The 17$^{th}$ aspect of the present invention is the information reproducing method of an optical information reproducing apparatus according to the 16$^{th}$ aspect of the present invention, wherein said control unit has at least one of a function of determining a reproduction speed for reading out information from said information recording medium and a function of identifying a type of said information recording medium, said magnitude of said current on which said high-frequency current is to be superimposed is determined based on at least one information of i) said type of said information recording medium identified by said control unit, ii) said reproduction speed determined by said control unit and iii) reproduction layer information indicating which one of information recording surfaces on said information recording medium is reproduced.

The 18$^{th}$ aspect of the present invention is the information reproducing method of an optical information reproducing apparatus according to the 17$^{th}$ aspect of the present invention, wherein said control unit has said function of determining a reproduction speed and said function of identifying a type of said information recording medium, said parameter of said high-frequency current is determined based on said identified type of said information recording medium and said determined said reproduction speed, said determined said parameter of said high-frequency current includes an amplitude set value which sets an amplitude value of said high-frequency current and a frequency set value which sets a frequency of said high-frequency current, which are used at said laser drive unit.

Accordingly, for example, since the parameter of the high-frequency current is determined according to the type and reproduction speed of the information recording medium, an information reproducing method of an optical information reproducing apparatus which can prevent the deterioration of reproduction light and can perform the reproduction with the suppressed jitter can be provided.

Also, for example, an information reproducing method of an optical information reproducing apparatus of the present invention may identify that the type of the information recording medium is either the read-only type, write-once type or rewritable type, and may determine the parameter of the high-frequency current based on the result of the identification.

Accordingly, for example, an information reproducing method of an optical information reproducing apparatus which can prevent the deterioration of reproduction light regardless of the type of the information recording medium can be provided.

The $19^{th}$ aspect of the present invention is the information reproducing method of an optical information reproducing apparatus according to the $18^{th}$ aspect of the present invention, wherein said parameter of said high-frequency current is set so that a ratio of a peak level value and an average level value of a light intensity of said laser beam is equal to or less than a predetermined value.

The $20^{th}$ aspect of the present invention is the information reproducing method of an optical information reproducing apparatus according to the 19th aspect of the present invention, wherein said predetermined value is a threshold value which does not cause damage to recorded information on said information recording medium by said laser beam when said information recording medium is reproduced.

The $21^{st}$ aspect of the present invention is the information reproducing method of an optical information reproducing apparatus according to the $20^{th}$ aspect of the present invention, wherein said predetermined value differs depending on said type of said information recording medium, said reproduction speed, or which information recording surface of said information recording medium is reproduced.

Accordingly, for example, an information reproducing method of an optical information reproducing apparatus which can prevent the deterioration of reproduction light regardless of the type of the information recording medium, reproduction speed of the information recording medium or the information recording surface which is to be reproduced can be provided.

The $22^{nd}$ aspect of the present invention is the information reproducing method of an optical information reproducing apparatus according to any one of the $19^{th}$ to the $21^{St}$ aspects of the present inventions, wherein said information recording and reproducing apparatus has a storage unit which stores said parameter of said high-frequency current, and said parameter is set in advance, wherein said parameter of said high-frequency current is selectively read out from said storage unit based on a result of identifying said type of said information recording medium and said determined reproduction speed.

Accordingly, for example, an information reproducing method of an optical information reproducing apparatus which does not need the learning at the time of the start and has a short rising time can be provided.

The $23^{rd}$ aspect of the present invention is the information reproducing method of an optical information reproducing apparatus according to the $19^{th}$, the $21^{st}$ or the $22^{nd}$ aspects of the present inventions, wherein said parameter of said high-frequency current is set so that said ratio of a peak level value and a average level value of a light intensity of said laser beam becomes smaller in the case of said information recording medium being a rewritable type than in the case of said information recording medium being a read-only type.

Accordingly, for example, an information reproducing method of an optical information reproducing apparatus which prevents the deterioration of reproduction light and can perform the reproduction with the suppressed jitter with respect to the recording medium of the read-only type without the deterioration of reproduction light can be provided.

The $24^{th}$ aspect of the present invention is the information reproducing method of an optical information reproducing apparatus according to the $19^{th}$, the $21^{st}$ or the $22^{nd}$ aspects of the present inventions, wherein said parameter of said high-frequency current is set so that said ratio of a peak level value and a average level value of a light intensity of said laser beam becomes smaller in the case of said information recording medium being a rewritable type than in the case of said information recording medium being a write-once type.

Accordingly, for example, an information reproducing method of an optical information reproducing apparatus which prevents the deterioration of reproduction light and can perform the reproduction with the suppressed jitter with respect to the recording medium of the write-once type can be provided.

The $25^{th}$ aspect of the present invention is the information reproducing method of an optical information reproducing apparatus according to the $23^{rd}$ or the $24^{th}$ aspects of the present inventions, wherein an amplitude of said high-frequency current, which is set in advance with respect to said read-only type or said write-once type, is smaller than an amplitude of said high-frequency current, which is set in advance with respect to said recordable type or said rewritable type.

Accordingly, for example, an information reproducing method of an optical information reproducing apparatus which can lower the peak level of the light intensity and can prevent the deterioration of reproduction light can be provided.

The $26^{th}$ aspect of the present invention is the information reproducing method of an optical information reproducing apparatus according to the $23^{rd}$ or the $24^{th}$ aspects of the present inventions, wherein a frequency of said high-frequency current, which is set in advance with respect to said read-only type or said write-once type, is smaller than a frequency of said high-frequency current, which is set in advance with respect to said recordable type or said rewritable type.

Accordingly, for example, an information reproducing method of an optical information reproducing apparatus which can lower the peak level of the light intensity and can prevent the deterioration of reproduction light can be provided.

The $27^{th}$ aspect of the present invention is the information reproducing method of an optical information reproducing apparatus according to the $22^{nd}$ aspect of the present invention, wherein said amplitude set value which is included in said parameter of said high-frequency current stored by said storage unit is set in advance so that a predetermined amplitude is obtained, and the other amplitude set value is calculated by using said amplitude set value stored by said storage unit.

Accordingly, for example, an information reproducing method of an optical information reproducing apparatus in which the smallest amplitude set value having a small effect of suppressing the jitter is accurately set to lower influence of the set error and the number of setting steps of the other set values is reduced to be able to realize low cost can be provided.

The 28th aspect of the present invention is the information reproducing method of an optical information reproducing apparatus according to the 19th aspect of the present invention, wherein said control unit changes said determined parameter when said reproduction speed is changed during reproduction of said information recorded on said information recording medium or said information recording surface to be reproduced is changed.

Accordingly, for example, since the parameter of the high-frequency current is changed according to the change of the reproduction speed of the information recording medium or the change of the information recording surface which is to be reproduced, an information reproducing method of an optical information reproducing apparatus which can prevent the deterioration of reproduction light and can perform the reproduction with the suppressed jitter can be provided.

The 29th aspect of the present invention is the information reproducing method of an optical information reproducing apparatus according to the 28th aspect of the present invention, wherein when said reproduction speed is changed in an increase direction during reproduction of said information recorded on said information recording medium which is recordable, said average level value of said light intensity of said laser beam is increased after said parameter of said high-frequency current is changed.

Accordingly, for example, an information reproducing method of an optical information reproducing apparatus which can prevent the deterioration of reproduction light even when the reproduction speed is increased during reproduction operation can be provided.

The 30th aspect of the present invention is the information reproducing method of an optical information reproducing apparatus according to the 28th aspect of the present invention, wherein when said reproduction speed is changed in a decrease direction during reproduction of said information recorded on said information recording medium which is recordable, said parameter of said high-frequency current is changed after said average level value of said light intensity of said laser beam is decreased.

Accordingly, for example, an information reproducing method of an optical information reproducing apparatus which can prevent the deterioration of reproduction light even when the reproduction speed is decreased during reproduction operation can be provided.

Also, in case of an information reproducing method of an optical information reproducing apparatus of the present invention, an oscillation wavelength of the semiconductor laser may be 390 nm or more and 450 nm or less.

Accordingly, for example, an information reproducing method of an optical information reproducing apparatus which can prevent the deterioration of the information recording medium when the reproduction of the information recording medium is performed in high-density by the laser beam with the wavelength range of 390 nm or more and 450 nm or less can be provided.

The 31st aspect of the present invention is a program for causing a computer to perform a function of said control unit of said optical information reproducing apparatus according to the 1st aspect of the present invention, wherein said control unit determines a parameter of said high-frequency current based on magnitude of a current on which said high-frequency current is to be superimposed.

The 32nd aspect of the present invention is a program for causing a computer to execute said step of said information reproducing method of the optical information reproducing apparatus according to the 16th aspect of the present invention, wherein said step is the step in which said control unit determines a parameter of said high-frequency current based on magnitude of a current on which said high-frequency current is to be superimposed.

The 33rd aspect of the present invention is a recording medium holding said program according to the 31st or 32nd aspects of the present inventions, said recording medium being processable by a computer.

According to the above described configuration, an information reproducing apparatus which has no occurrence of deterioration of reproduction light, has a good jitter, and has a high efficiency and high reliability can be provided.

Advantage of the Inventions

According to the present invention, an information reproducing apparatus, an information reproducing method of an optical information reproducing apparatus, a program and a recording medium, which can suppress occurrence of the damage to the information recorded on a recording medium due to the laser beam and has a high reliability, can be provided.

MODE FOR CARRYING OUT THE INVENTION

In the following, an embodiment of the present invention will be described by reference to the drawings.

(Embodiment)

Figure 1:
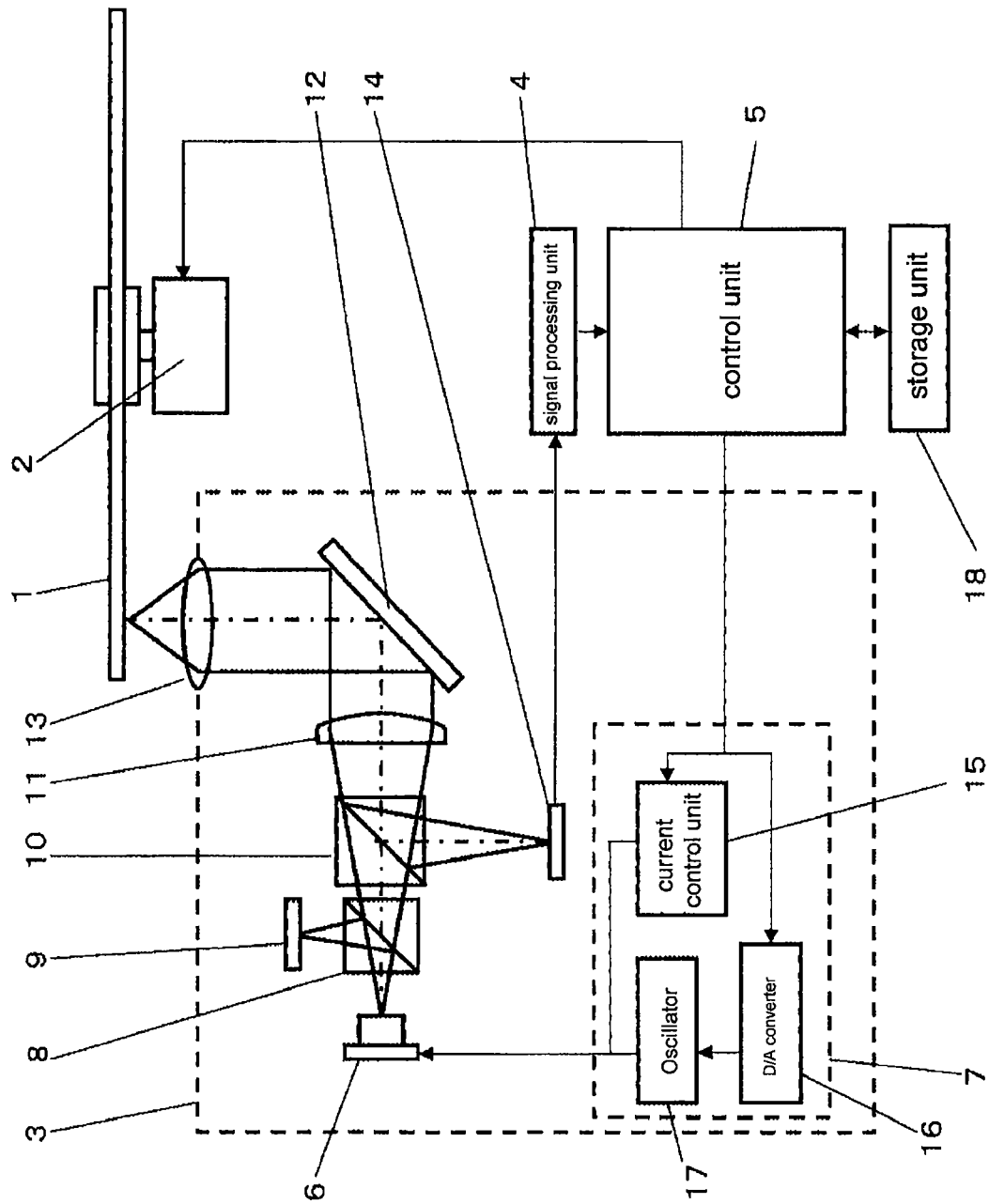
FIG. 1 is a block diagram of an optical information reproducing apparatus according to an embodiment of the present invention.

FIG. 1 is a block diagram of an optical information reproducing apparatus according to one embodiment of the present invention.

I. The configuration of the optical information reproducing apparatus according to the present embodiment will be described by reference to FIG. 1.

An optical disc 1 is an information recording medium on which digital information is recorded, and includes one or a plurality of unillustrated information recording surfaces.

A spindle motor 2 is a motor which drives the optical disc 1 at arbitrary number of revolutions. An optical pickup 3 is a device which irradiates the optical disc 1 with a laser beam and converts a reflected light into an electric signal to read out the information recorded on the optical disc 1 as an analog signal. A signal processing unit 4 is a device which converts the signal read out from the optical pickup 3 into a digital signal. A control unit 5 is a device which includes one or a plurality of LSIs, and, besides processing the digital signal transmitted from the signal processing unit 4, controls the intensity of the laser beam emitted from the optical pickup 3 and the rotation speed of the spindle motor 2.

When the control unit 5 changes the rotation speed of the spindle motor 2, a linear speed at which the laser beam scans the optical disc 1 is changed. Thus, a reproduction (or recording) speed to read out the information from the optical disc 1 can be changed. The control unit 5 also adjusts the intensity of the laser beam according to the speed.

Next, the inner configuration of the optical pickup 3 will be described.

A semiconductor laser 6 is an element which emits a laser beam with a wavelength of 390 nm or more and 450 nm or less, preferably, a laser beam with a wavelength of 405 nm. A laser drive unit 7 is a device which supplies a drive current to the semiconductor laser 6 to cause the semiconductor laser 6 to emit a laser beam. The laser drive unit 7 also has a function of superimposing a high-frequency current on a drive current as a reference (referred to as reference drive current below) and thereby generating a drive current to be supplied to the semiconductor laser 6.

The "reference drive current" in the present embodiment is one of examples of a "current on which the high-frequency current is to be superimposed" in the present invention.

As for the laser beam emitted from the semiconductor laser 6, an outgoing light toward the optical disc 1 is split by a front light beam splitter 8 to partly enter a front light monitor 9. The control unit 5 controls the laser drive unit 7 such that the intensity of the laser beam reaches a predetermined value based on a monitor signal from the front light monitor 9. The outgoing light passing through the front light beam splitter 8 passes through a beam splitter 10 which splits a return light, and is converted into a collimated light by a collimator lens 11.

The collimator lens 11 includes an unillustrated actuator to be movable in an optical axis direction, and has a function of correcting spherical aberration.

When the optical disc 1 has a plurality of information recording surfaces, spherical aberration occurs due to a difference in thickness between an information recording surface to be reproduced and a laser beam incident surface of the optical disc 1. Thus, the collimator lens 11 is moved in the optical axis direction to correct a difference in amount of spherical aberration occurring when reproduction of one information recording surface is switched to reproduction of another information recording surface.

The outgoing light converted into the collimated light by the collimator lens 11 is reflected by a rising mirror 12, and collected by an objective lens 13 to be focused on an unillustrated information recording surface of the optical disc 1.

A reflected light (a return light) from the optical disc 1 travels in a direction opposite to that of the outgoing light inside the optical pickup 3 to pass through the objective lens 13, the rising mirror 12, and the collimator lens 11. The reflected light is then reflected by the beam splitter 10, and enters an optical detector 14 to be converted into an RF signal or a servo signal.

Although the reflected light from the optical disc 1 mostly returns to the optical detector 14, a remaining portion of the reflected light returns to the semiconductor laser 6, so that noise is mixed into the laser beam. With the noise being mixed, jitter increases when the RF signal is converted into the digital signal by the signal processing unit 4. The quality of reproduced information is thereby degraded.

To prevent the above problem, when the laser drive unit 7 supplies the drive current to the semiconductor laser 6, a high-frequency component with a predetermined frequency and a predetermined amplitude value is superimposed on the reference drive current. A single-mode laser is thereby changed into a multi-mode laser to suppress the jitter. The laser drive unit 7 includes a current control unit 15, a D/A converter 16, and an oscillator 17 therein.

The control unit 5 causes the current control unit 15 to generate the reference drive current for the semiconductor laser 6, and transmits set value data (see FIGS. 4 and 5) that respectively sets the amplitude and frequency of the high-frequency current to be superimposed on the reference drive current to the D/A converter 16. The D/A converter 16 converts the set value data into an analog voltage signal, and inputs the analog voltage signal into the oscillator 17. The oscillator 17 generates the high-frequency current with the set frequency and amplitude. The generated high-frequency current is coupled to the reference drive current via an unillustrated capacitor.

Here, the set value data that respectively sets the amplitude and frequency as parameters of the high-frequency current is individually stored in a storage unit 18 as a memory according to the reproduction speed and the type of the optical disc 1. The control unit 5 selects optimum values (the amplitude and the frequency) according to the reproduction speed and the type of the optical disc 1, reads out the set value data corresponding thereto from the storage unit 18, and transmits the read-out set value data to the laser drive unit 7.

How the values (the amplitude and the frequency) corresponding to the reproduction speed and the type of the optical disc 1 are determined will be further described later.

Also, the parameters of the high-frequency current may include a case in which the frequency is 0. The case will be further described in VIII.

II. Next, the operation of the optical information reproducing apparatus according to the present embodiment, and an information reproducing method of the optical information reproducing apparatus according to one embodiment of the present invention will be described.

When the optical disc 1 is inserted into the optical information reproducing apparatus and set at a position where the optical disc 1 can be rotationally driven by an unillustrated loading mechanism, the control unit 5 drives the optical disc 1 at a predetermined rotation speed, and reads out the type of the optical disc 1 itself (read-only, write-once, rewritable), and supportable reproduction speeds written on the innermost periphery of the optical disc 1 by using the optical pickup 3.

Subsequently, information is recorded or reproduced on or from the optical disc 1 based on an instruction from a user. The operation in reproduction will be mainly described in the present embodiment.

When the optical information reproducing apparatus reproduces the information recorded on the optical disc 1, the control unit 5 selects an appropriate speed (for example, a highest speed) from the supportable reproduction speeds of the optical disc 1 read out when the optical disc 1 is inserted, and drives the spindle motor 2 at the corresponding rotation speed to rotate the disc 1.

The light intensity of the laser beam, and the set value data corresponding to the parameters (the frequency and the amplitude value) of the high-frequency current to be superimposed on the reference drive current by the laser drive unit 7 are read out from the storage unit 18 and set according to the type of the disc 1 (read-only, write-once, rewritable), and the reproduction speed.

The magnitude of the reference drive current is determined based on at least one of i) the type of the optical disc 1 identified by the control unit 5, ii) the reproduction speed determined by the control unit 5, and iii) reproduction layer information indicating which information recording surface is reproduced when the optical disc 1 has a plurality of information recording surfaces.

Figure 2:
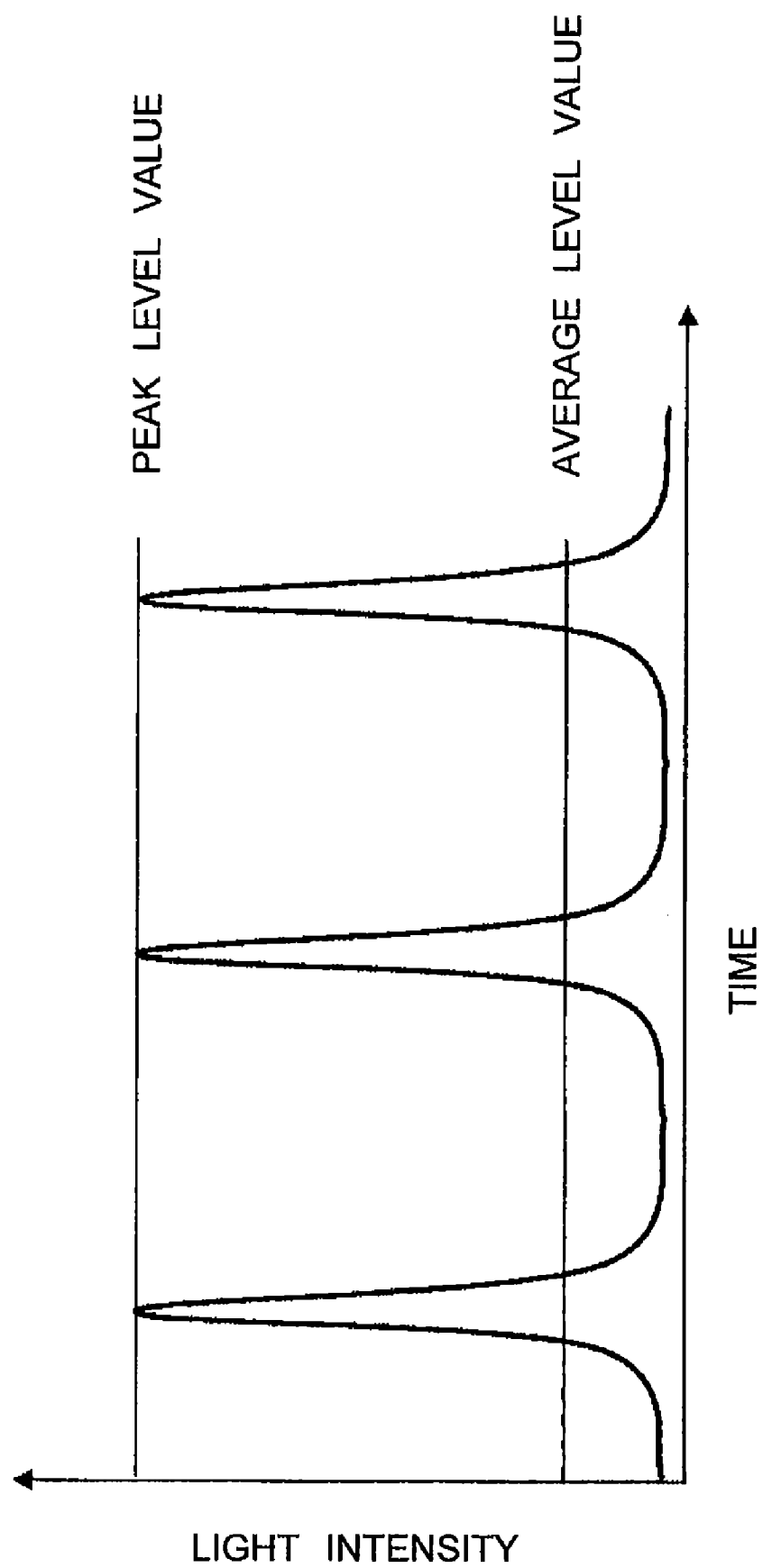
FIG. 2 is a waveform diagram illustrating a time change in laser beam intensity of an optical information reproducing apparatus according to an embodiment of the present invention.

FIG. 2 is a waveform diagram illustrating a time change in laser beam intensity of the optical information reproducing apparatus according to the embodiment of the present invention.

The waveform of the light intensity of the laser beam emitted by the drive current on which the high-frequency component is superimposed has sharp peaks at time intervals corresponding to the frequency of the drive current on which the high-frequency current is superimposed. A peak level value thereof is considerably higher than an average level value of the laser beam. The peak level value varies depending on the magnitude of the amplitude of the drive current on which the high-frequency current is superimposed and the superimposed frequency.

When the peak level value is higher than a predetermined value, the information that has already been recorded may be deleted (deterioration of reproduction light). To prevent the deterioration of reproduction light, the parameters of the high-frequency current to be superimposed need to be set such that the peak level value is equal to or less than the predetermined value.

The peak level value at which the deterioration of reproduction light does not occur differs depending on the type of the optical disc 1, the reproduction speed, or which information recording surface is reproduced when the optical disc has a plurality of information recording surfaces. Meanwhile, when the peak level value is lowered too much in order to suppress the deterioration of reproduction light, the effect of superimposing the high-frequency current is reduced, so that laser noise increases to degrade the jitter.

Accordingly, in the embodiment of the present invention, at least one of the values of the frequency and the amplitude as the parameters of the high-frequency current to be superimposed is determined based on the type of the optical disc 1 (read-only, rewritable, write-once), the reproduction speed, or which information recording surface is reproduced when the optical disc has a plurality of information recording surfaces.

When the parameters of the high-frequency current are determined, the parameters of the high-frequency current are set such that a ratio of the peak level value and the average level value of the light intensity of the laser beam (the peak level value/the average level value) is equal to or less than a predetermined threshold value. The predetermined threshold value is a threshold value that does not cause damage to the recorded information on the optical disc 1 by the laser beam when the recorded information is reproduced. Since the predetermined threshold value differs depending on the type of the optical disc, the reproduction speed, or which information recording surface of the optical disc 1 is reproduced, it is preferable to determine the threshold value in advance by an experiment or the like.

A relationship between the parameters of the high-frequency current and the predetermined threshold value will be specifically described below.

III. Next, the operation in a case in which the optical disc 1 to be reproduced is identified as a recordable (rewritable or write-once) type by the optical disc identification function of the control unit 5, and the reproduction is determined to be performed at a double speed will be described.

In the optical information reproducing apparatus according to the present embodiment, the parameters of the high-frequency current are set such that the ratio of the peak level value and the average level value of the light intensity of the laser beam is equal to or less than the predetermined threshold value (in the present embodiment, the predetermined threshold value is 7.7, for example). The threshold value 7.7 is determined in advance by an experiment.

The threshold value 7.7 is a threshold value at which the deterioration of reproduction light does not occur when the optical disc 1 is reproduced at the double speed. The parameters of the high-frequency current are set so as not to exceed the threshold value by also taking laser characteristic variations and temperature characteristics into consideration.

Figure 3:
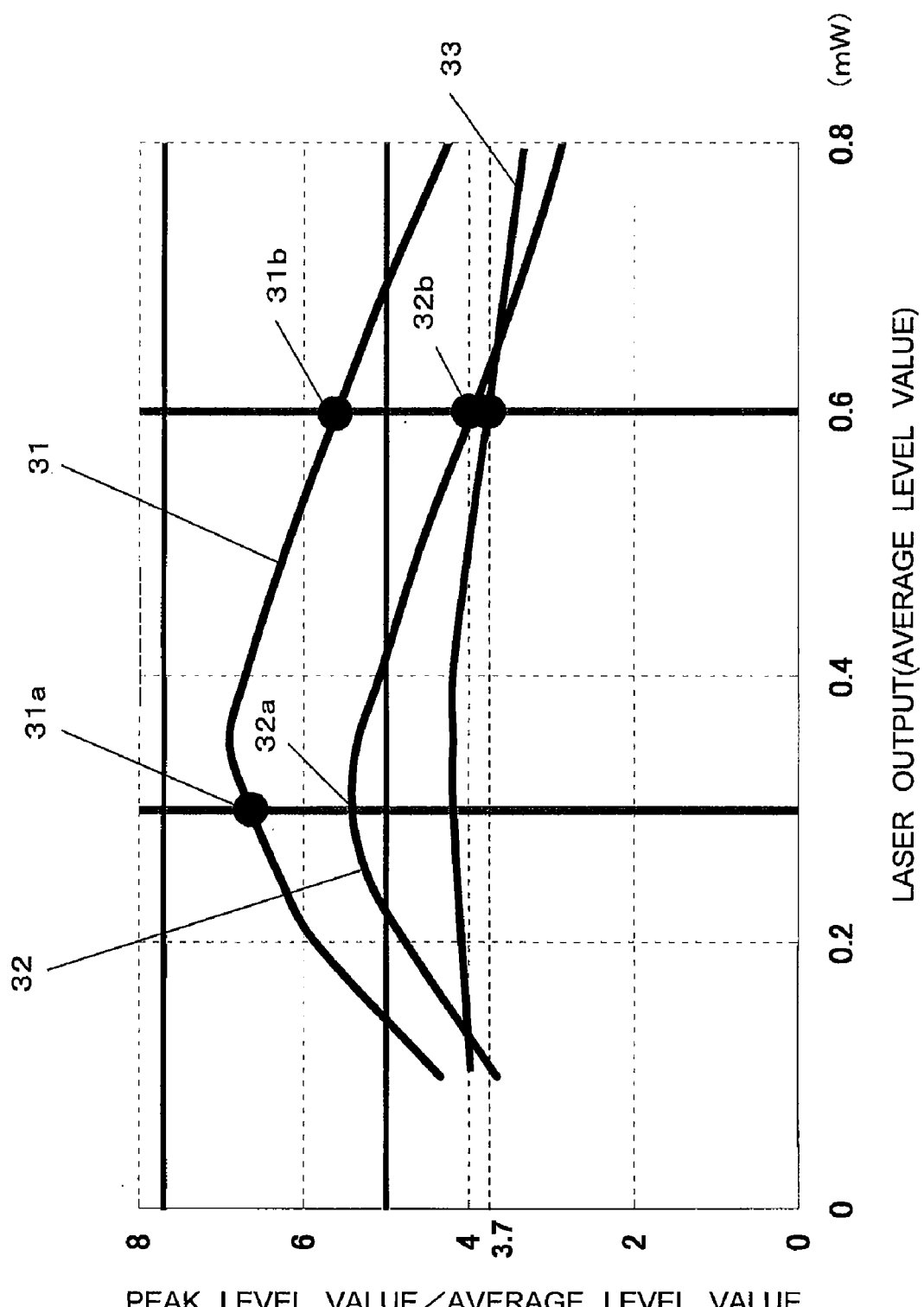
FIG. 3 is a view illustrating a relationship between the ratio of the peak level value and the average level value of the intensity of the laser beam, and a laser output in an optical information reproducing apparatus according to an embodiment of the present invention.

FIG. 3 is a view illustrating a relationship between the ratio of the peak level value and the average level value of the intensity of the laser beam (the peak level value/the average level value), and a laser output (an average level value) in the optical information reproducing apparatus according to the embodiment of the present invention.

A curve line 31 in FIG. 3 plots the value of the peak level value/the average level value obtained when the set value data (an amplitude set value and a frequency set value) corresponding to an amplitude value of 5 mApp of the high-frequency current to be superimposed (referred to as high frequency superimposition amplitude value below), and a frequency of 400 MHz of the high-frequency current to be superimposed (referred to as high frequency superimposition frequency below) is input to the laser drive unit 7, and the laser output is changed in a range of 0.1 to 0.8 mW.

Also, a curve line 32 in FIG. 3 plots the value of the peak level value/the average level value obtained when the set value data corresponding to a high frequency superimposition amplitude value of 3.3 mApp, and a high frequency superimposition frequency of 400 MHz is input to the laser drive unit 7, and the laser output is changed in a range of 0.1 to 0.8 mW.

Also, a curve line 33 in FIG. 3 plots the value of the peak level value/the average level value obtained when the set value data corresponding to a high frequency superimposition amplitude value of 5 mApp, and a high frequency superimposition frequency of 460 MHz is input to the laser drive unit 7, and the laser output is changed in a range of 0.1 to 0.8 mW.

In the optical information reproducing apparatus according to the present embodiment, when the optical disc 1 is the recordable (write-once or rewritable) type, and the reproduction is performed at the double speed as the reproduction condition, it is set in advance that a laser output of 0.3 mW is used.

In this case, the set value data corresponding to a high frequency superimposition amplitude value of 5 mApp, and a high frequency superimposition frequency of 400 MHz (see the curve line 31 in FIG. 3) is read out from the storage unit 18. The reason is as follows.

As the selectable set value data, the peak level value/the average level value is required to be equal to or less than 7.7 to prevent the deterioration of reproduction light when the laser output is 0.3 mW. Since the peak level value/the average level value is 6.6 at a point 31*a* on the curve line 31, and 5.4 at a point 32*a* on the curve line 32, the condition that the peak level value/the average level value is equal to or less than the threshold value 7.7 is satisfied (see FIG. 3).

Meanwhile, as the peak level value/the average level value is larger (for example, as the high frequency superimposition amplitude value is set to be larger), the effect of suppressing the jitter is improved. Thus, the set value data corresponding to the point 31*a* on the curve line 31 is selected.

The curve line 31 is a curve line obtained when the largest high frequency superimposition amplitude value (5 mApp) is set among a plurality of curve lines where the peak level value/the average level value is equal to or less than 7.7 in a case in which the high frequency superimposition frequency is set to 400 MHz and the variations of temperature characteristics or the like are also taken into consideration.

IV. Next, the operation in a case in which the optical disc 1 to be reproduced is identified as a recordable (rewritable or write-once) type by the optical disc identification function of the control unit 5, and the reproduction is determined to be performed at a quadruple speed will be described.

In the optical information reproducing apparatus according to the present embodiment, the parameters of the high-frequency current are set such that the ratio of the peak level and the average level of the light intensity of the laser beam is equal to or less than a predetermined threshold value smaller than that in the reproduction at the double speed (in the present embodiment, the predetermined threshold value is 5, for example).

The threshold value 5 is a threshold value at which the deterioration of reproduction light does not occur when the optical disc 1 is reproduced at the quadruple speed. The threshold value 5 is determined in advance by an experiment.

It is necessary to increase the average level value of the light intensity at the time of high-speed reproduction. The peak level value is also increased according to the increase in the average level value. Thus, to prevent the deterioration of reproduction light, the parameters of the high-frequency current need to be changed such that the peak level value is reduced.

Accordingly, in the optical information reproducing apparatus according to the present embodiment, the parameters of the high-frequency current are set such that the ratio of the peak level value and the average level value is smaller than that in the reproduction at the double speed, and is equal to or less than 5 by also taking laser characteristic variations and temperature characteristic variations into consideration.

In the optical information reproducing apparatus according to the present embodiment, when the optical disc 1 is the recordable (write-once or rewritable) type, and the reproduction is performed at the quadruple speed as the reproduction condition, it is set in advance that a laser output of 0.6 mW is used.

In this case, the set value data corresponding to a high frequency superimposition amplitude value of 3.3 mApp, and a high frequency superimposition frequency of 400 MHz (see the curve line 32 in FIG. 3) is read out from the storage unit 18. The reason is as follows.

As the selectable set value data, the peak level value/the average level value is required to be equal to or less than 5 to prevent the deterioration of reproduction light when the laser output is 0.6 mW.

Since the peak level value/the average level value is 4 at a point 32*b* on the curve line 32, the condition that the peak level value/the average level value is equal to or less than the threshold value 5 is satisfied (see FIG. 3). However, since the peak level value/the average level value is 5.6 at a point 31*b* on the curve line 31, the condition that the peak level value/the average level value is equal to or less than the threshold value 5 is not satisfied (see FIG. 3).

That is, if the reproduction at the quadruple speed is performed using the same parameters of the high-frequency current as those of the reproduction at the double speed (the high frequency superimposition amplitude is 5 mApp and the high frequency superimposition frequency is 400 MHz), the ratio of the peak level value and the average level value is 5.6, which exceeds the acceptable value 5. The deterioration of reproduction light is thereby caused.

Thus, the set value data corresponding to the point 32*b* on the curve line 32 is selected.

The curve line 32 is a curve line obtained when the largest high frequency superimposition amplitude value (3.3 mApp) is set among a plurality of curve lines where the peak level value/the average level value is equal to or less than the threshold value 5 in a case in which the high frequency superimposition frequency is set to 400 MHz and the variations of temperature characteristics or the like are also taken into consideration.

In the present embodiment, the parameters of the high-frequency current are changed depending on the difference in the reproduction speed as described above. Accordingly, the highly reliable optical information reproducing apparatus capable of preventing the deterioration of reproduction light can be achieved.

Furthermore, as described above, in the case in which the parameters are set such that the peak level value/the average level value is equal to or less than the preset threshold value, the largest high frequency superimposition amplitude value is set in consideration of the effect of suppressing the jitter.

To reduce the ratio of the peak level value and the average level value of the light intensity, the superimposition frequency may be also increased without changing the superimposition amplitude, so that a similar effect can be obtained.

For example, when the optical disc 1 to be reproduced is the recordable (rewritable or write-once) type and the reproduction is performed at the quadruple speed, the ratio of the peak level value and the average level value of the intensity of the laser beam can be reduced by setting the high frequency superimposition amplitude to 5 mApp, and increasing the high frequency superimposition frequency from 400 MHz to 460 MHz (see the curve line 33 in FIG. 3).

In this case, the peak level value/the average level value is 3.7 when the laser output is 0.6 mW as indicated by the curve line 33 in FIG. 3. Thus, the condition that the peak level value/the average level value should be equal to or less than the threshold value 5 is satisfied.

Also, to reduce the ratio of the peak level value and the average level value, the decrease in superimposition amplitude, and the increase in superimposition frequency may be employed in combination.

V. Next, the operation in a case in which the optical disc 1 to be reproduced is a read-only type will be described.

Since the deterioration of reproduction light does not occur in this case, it is not necessary to reduce the ratio of the peak level value/the average level value of the intensity of the laser beam. For example, the high frequency superimposition amplitude is set to 7 mApp, and the high frequency superimposition frequency is set to 400 MHz. Alternatively, if the jitter degradation is within an acceptable range, the number of set value data to be set in advance may be reduced by setting the high frequency superimposition amplitude to be the same as the amplitude (5 mApp) in the reproduction at the double speed for the recordable optical disc.

Also, in the recordable optical disc, the deterioration of reproduction light occurs more easily in the rewritable type where information can be deleted than in the write-once type where information cannot be deleted. Thus, the ratio of the peak level and the average level of the light intensity may be reduced to, for example, 4.5 or less in the rewritable optical disc, so that the more reliable optical information reproducing apparatus can be provided.

VI. Next, the operation when the reproduction speed is changed during reproduction operation will be described.

The reproduction speed is increased during reproduction operation when the optical information reproducing apparatus is changed from a state in which the reproduction is suspended and the optical disc 1 is driven at a low rotation speed to save power to a state in which the rotation speed of the optical disc 1 is increased to a high rotation speed to restart the reproduction, for example.

The operation of increasing the reproduction speed during reproduction operation is performed by the following procedure.

That is, the control unit 5 increases the rotation speed of the spindle motor first (step 101)

Subsequently, the parameter setting of the high-frequency current is changed according to the speed after the change. The ratio of the peak level value and the average level value of the light intensity is thereby reduced (step 102).

The intensity of the laser beam is then increased (step 103).

If the intensity of the laser beam is increased before the parameter setting of the high-frequency current is changed, the peak level of the intensity of the laser beam exceeds a level at which the deterioration of reproduction light occurs. By following the above procedure, the peak level can be prevented from exceeding the level at which the deterioration of reproduction light occurs. Accordingly, the highly reliable optical information reproducing apparatus can be provided.

Also, the reproduction speed is decreased during reproduction operation when the quality of a reproduction signal is degraded due to vibrations caused when the optical disc 1 is driven at a high rotation speed, for example.

The operation of decreasing the reproduction speed during reproduction operation is performed by the following procedure.

That is, the control unit 5 reduces the rotation speed of the spindle motor first (step 201)

Subsequently, the intensity of the laser beam is reduced (step 202).

The parameter setting of the high-frequency current is then changed according to the speed after the change. The ratio of the peak level and the average level of the light intensity is thereby increased (step 203).

The operation in steps 202 to 203 described above will be specifically described by reference to FIG. 3.

The laser output is reduced from 0.6 mW to 0.3 mW in step 202, which corresponds to transition from the point 32b (the laser output is 0.6 mW, the high frequency superimposition amplitude value is 3.3 mApp, and the high frequency superimposition frequency is 400 MHz) to the point 32a (the laser output is 0.3 mW, the high frequency superimposition amplitude value is 3.3 mApp, and the high frequency superimposition frequency is 400 MHz) on the curve line 32 in FIG. 3.

Next, the peak level value/the average level value is increased from 5.4 to 6.6 in step 203, which corresponds to transition from the point 32a on the curve line 32 to the point 31a (the laser output is 0.3 mW, the high frequency superimposition amplitude value is 5 mApp, and the high frequency superimposition frequency is 400 MHz) on the curve line 31 in FIG. 3.

If the ratio of the peak level and the average level of the light intensity is increased before the intensity of the laser beam is reduced, the peak level of the intensity of the laser beam exceeds a level at which the deterioration of reproduction light occurs. By following the above procedure, the peak level can be prevented from exceeding the level at which the deterioration of reproduction light occurs. Accordingly, the highly reliable optical information reproducing apparatus can be provided.

VII. Next, the set value data (the frequency set value and the amplitude set value) stored in advance in the storage unit 18 of the optical information reproducing apparatus according to the present embodiment as the parameters of the high-frequency current will be described by reference to FIGS. 4 and 5.

Figure 4:
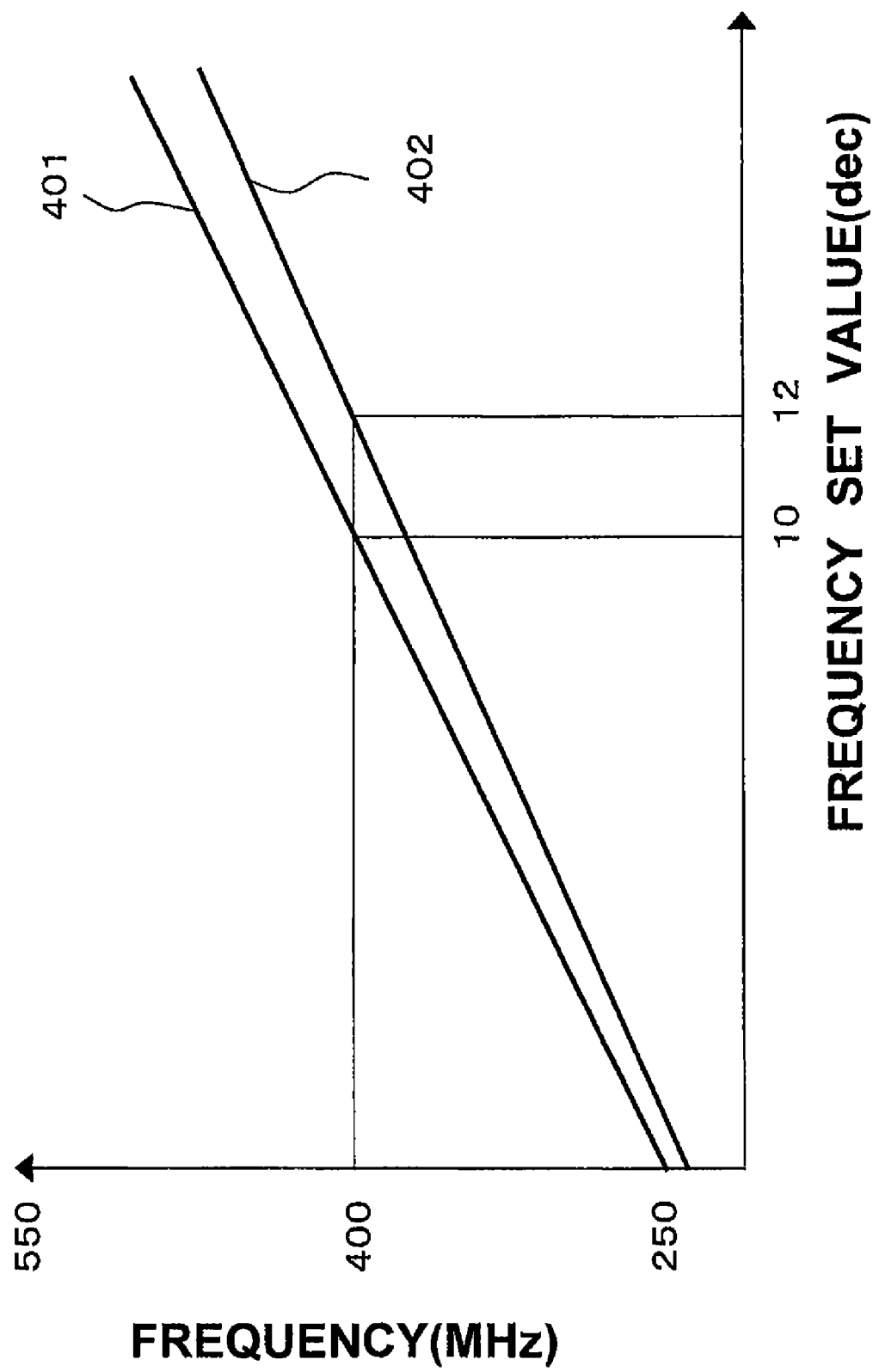
FIG. 4 is a view illustrating a relationship between the frequency set value and the high frequency superimposition frequency of the high-frequency current in an optical information reproducing apparatus according to an embodiment of the present invention.
Figure 5:
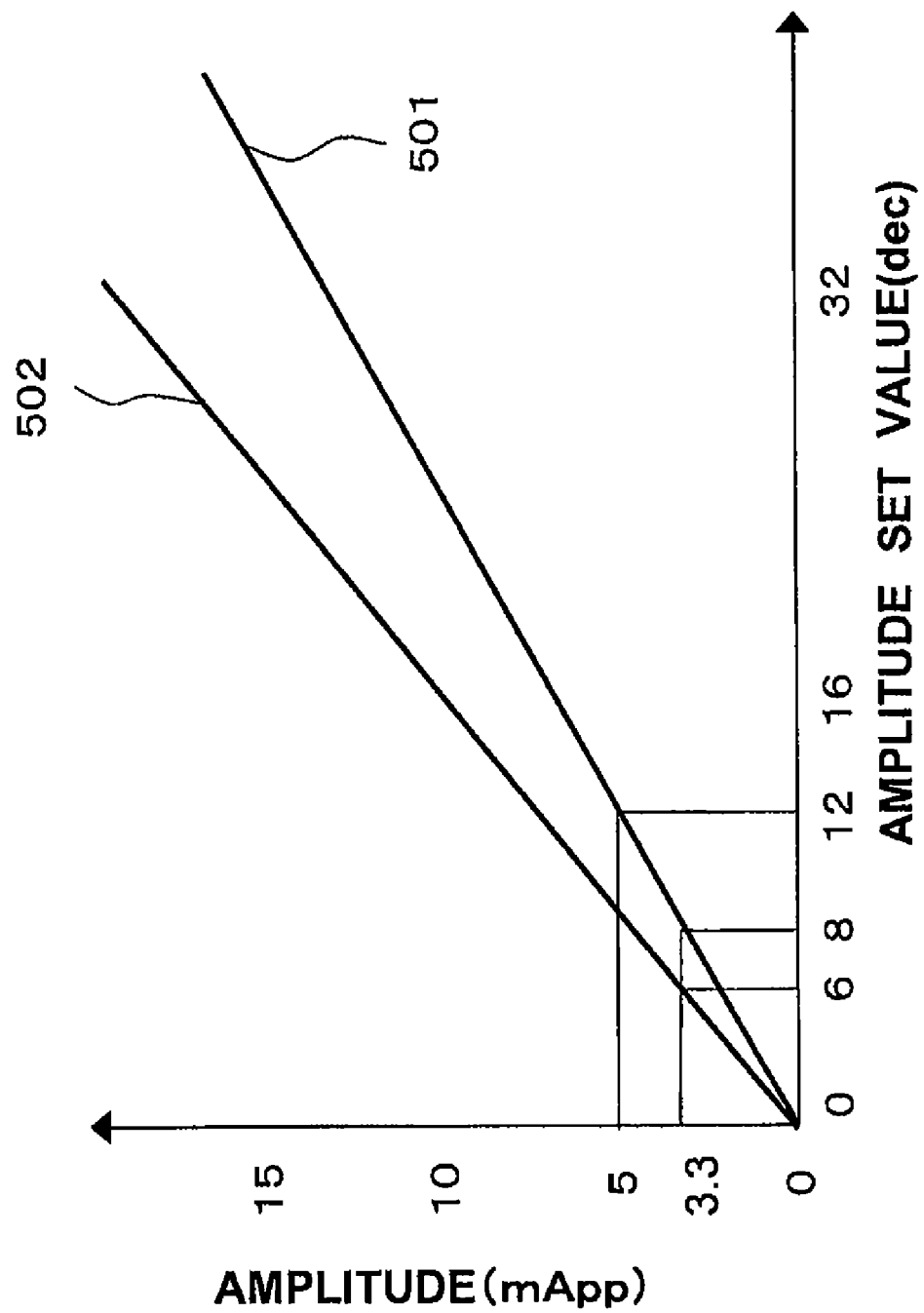
FIG. 5 is a view illustrating a relationship between the amplitude set value and the high frequency superimposition amplitude of the high-frequency current in an optical information reproducing apparatus according to an embodiment of the present invention.
Figure 6:
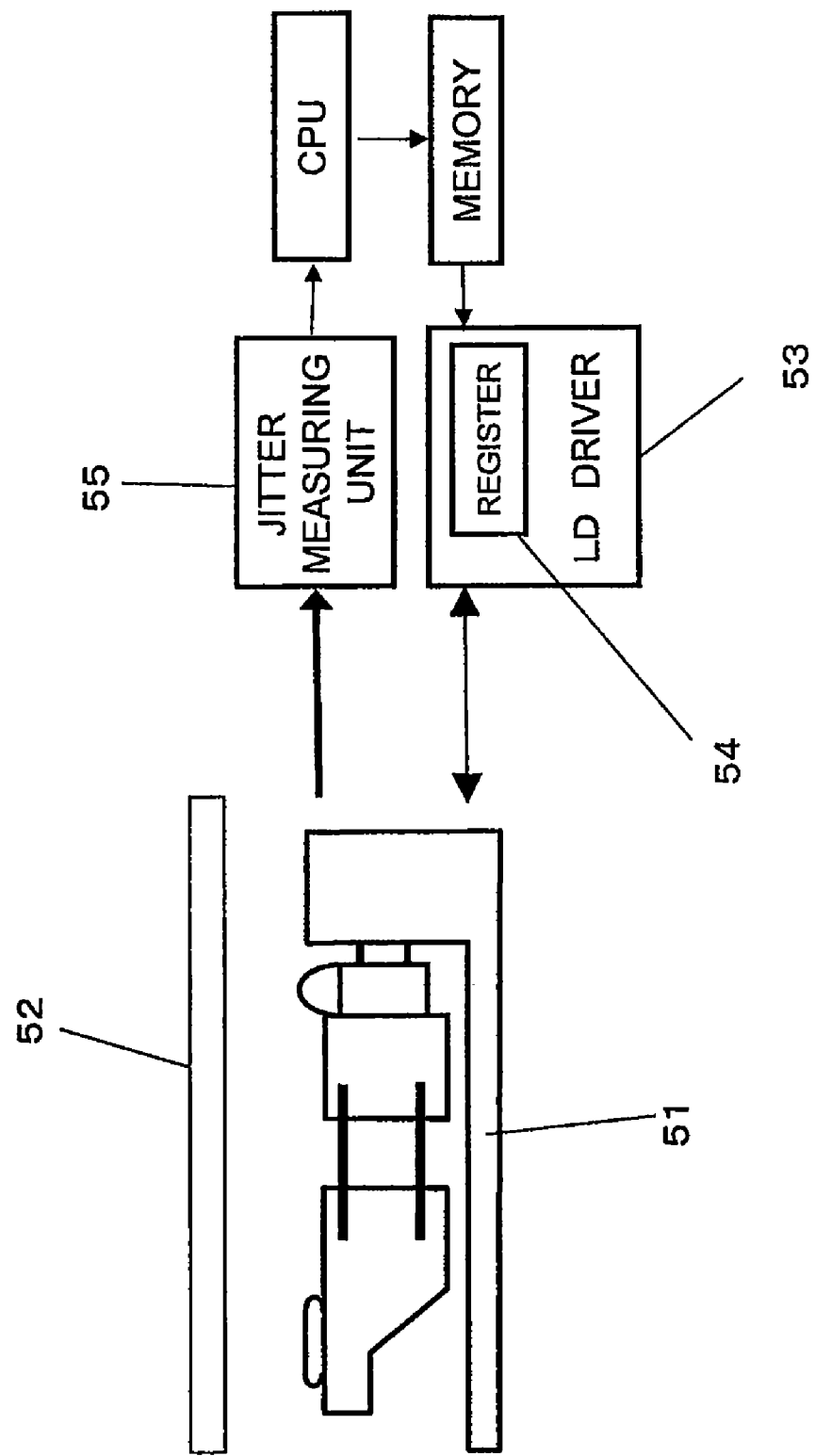
FIG. 6 is a block diagram of a conventional optical information reproducing apparatus.

FIG. 4 is a view illustrating a relationship between the frequency set value and the high frequency superimposition frequency of the high-frequency current in the optical information reproducing apparatus according to the embodiment of the present invention. FIG. 5 is a view illustrating a relationship between the amplitude set value and the high frequency superimposition amplitude of the high-frequency current in the optical information reproducing apparatus according to the embodiment of the present invention.

The frequency set value and the amplitude set value, which are set with respect to each type of the optical disc and each reproduction speed, corresponding to the high frequency superimposition frequency and the high frequency superimposition amplitude are stored in advance in the storage unit 18.

The control unit 5 selects the frequency set value and the amplitude set value (the set value data) described above from the storage unit 18 as the parameters of the high-frequency current corresponding to the result of identifying the type of the set optical disc 1 and determining the reproduction speed, and outputs the set value data to the D/A converter 16. The D/A converter 16 receives the set value data from the control unit 5, and causes the oscillator 17 to generate the corresponding frequency and amplitude.

However, even when the same set value data (the frequency set value and the amplitude set value) is employed, the actual high frequency superimposition frequency and high frequency superimposition amplitude are not the same due to the influences of the characteristic variations of the laser drive unit 7 or the like. Furthermore, the ratio of the peak level value and the average level value of the light intensity determined by the reference drive current, the high frequency superimposition frequency and amplitude or the like, and the jitter are also affected by the characteristic variations of the semiconductor laser 6 and a transmission path of the drive current.

For example, as shown in FIG. 4, in a case of using one optical information reproducing apparatus, a frequency of 400 MHz is obtained for the high-frequency current to be superimposed on the reference drive current by the laser drive unit 7 by setting the frequency set value to 10 (dec) (see a straight line 401 in FIG. 4). In a case of using another optical information reproducing apparatus, however, a frequency of 400 MHz cannot be obtained unless the frequency set value is set to 12 (dec) (see a straight line 402 in FIG. 4). The same applies to FIG. 5 (see straight lines 501 and 502 in FIG. 5).

Thus, the frequency set value and the amplitude set value are set according to predetermined adjustment and stored in the storage unit 18 when an individual optical information reproducing apparatus is manufactured.

Accordingly, the high-accurate setting can be achieved without being affected by the characteristic variations, and the highly reliable optical information reproducing apparatus can be obtained.

For example, a following method can be employed as the aforementioned predetermined adjustment at the time of manufacture.

Generally, when the reference drive current on which the high-frequency current is not superimposed is supplied to the semiconductor laser 6, a laser beam is not output until the reference drive current exceeds a predetermined value. After the current of the predetermined value or more is supplied, an output value of the laser beam rises substantially linearly. A relationship between the reference drive current and the output value of the laser beam differs depending on the characteristic variations of the semiconductor laser 6 or the like.

When the drive current on which the high-frequency current is superimposed is supplied to the semiconductor laser 6, substantially the same phenomenon as that described above occurs. However, as the amplitude value of the high-frequency current is larger, an average current value at which a laser beam starts to be output is smaller as compared to the predetermined value when the reference drive current is supplied. Accordingly, a difference $\Delta$Ith between the value of the reference drive current and the average current value of the drive current on which the high-frequency current is superimposed, which are supplied when the semiconductor laser 6 outputs a laser beam of a predetermined value, becomes an index of the influence of superimposition of the high-frequency current on the reference drive current.

Thus, a reference optical information reproducing apparatus in which the amplitude set value and the frequency set value of the high-frequency current are determined in advance such that the peak level value/the average level value satisfies a predetermined value is prepared, and a difference $\Delta$Ith in the reference apparatus is measured in advance with respect to each amplitude set value and each frequency set value of the high-frequency current used therein. To be more specific, a difference $\Delta$Ith1 based on the condition corresponding to the curve line 31 in FIG. 3 (the high frequency superimposition amplitude value is 5 mApp and the high frequency superimposition frequency is 400 MHz), and a difference $\Delta$Ith2 based on the condition corresponding to the curve line 32 (the high frequency superimposition amplitude value is 3.3 mApp and the high frequency superimposition frequency is 400 MHz) are measured in advance.

In the manufacturing process, the amplitude and frequency of the high-frequency current (see the values on the vertical axis in FIGS. 4 and 5) are adjusted with respect to each difference such that the same differences as the differences $\Delta$Ith1 and $\Delta$Ith2 in the above reference apparatus are generated in each optical information reproducing apparatus. By the adjustment, the influence of superimposition of the high-frequency current on the reference drive current in each apparatus can be made the same as the influence in the reference apparatus in the manufacturing process.

As a result, the frequency set value and the amplitude set value (see the values on the horizontal axis in FIGS. 4 and 5) can be accurately set in each apparatus.

The value of the reference drive current is adjusted such that the laser output described by reference to FIG. 3 can be obtained corresponding to each set value set as described above, that is, an output of 0.3 mW is obtained at the point 31a and an output of 0.6 mW is obtained at the point 32b.

The number of adjustment steps at the manufacturing stage can be reduced by not adjusting all of a plurality of set value data and storing the data in the storage unit 18 at the time of manufacture, but by adjusting only some of the set value data. In this case, the set data not stored in the storage unit 18 can be set by estimation (for example, proportional calculation) based on the values of the stored set value data when the optical disc 1 is reproduced.

For example, as indicated by the straight line 501 in FIG. 5, the standard amplitude set value in the once-write optical disc is 12 dec in the reproduction at the double speed (see the amplitude 5 mApp in FIG. 5), and 8 dec in the reproduction at the quadruple speed (see the amplitude 3.3 mApp in FIG. 5) (the ratio of the amplitude set value in the reproduction at the double speed to that in the reproduction at the quadruple speed is 1.5). The straight line 501 in FIG. 5 indicates a relationship between the high frequency superimposition amplitude and the amplitude set value in a standard optical information reproducing apparatus.

In this case, in a case in which the amplitude set value in the reproduction at the quadruple speed is 6 dec, which is smaller than the standard value 8 dec, in the adjusting process of one optical information reproducing apparatus, the amplitude set value in the reproduction at the double speed is estimated to be 9 dec that is 1.5 times the amplitude set value 6 dec in the reproduction at the quadruple speed (see the straight line 502 in FIG. 5). The estimated value is stored in the storage unit 18. The laser drive unit 7 can generate the high frequency superimposition amplitude equal to that of the standard value based on the set value smaller than the standard value. The amplitude set value in the reproduction at the double speed can be estimated to be smaller than the standard value. Accordingly, the number of steps at the time of manufacture can be reduced, and the optical information reproducing apparatus can be achieved at a low cost.

Since a calculation error occurs in the setting of the amplitude set value by estimation, it is more preferable to accurately set only the smallest amplitude set value (the amplitude set value corresponding to the amplitude 3.3 mApp in FIG. 5), which has a small effect of improving the jitter, as a target to be adjusted during the adjusting process, and set the larger amplitude set value (the amplitude set value corresponding to the amplitude 5 mApp in FIG. 5) by estimation at the time of estimation setting.

The case of using the inclination of the straight line 501 shown in FIG. 5 is described in the above example as the configuration for setting the amplitude set value by estimation. However, the present invention is not limited thereto. For example, in the adjusting process, the smallest amplitude set value may be set at high accuracy, and the inclination of the straight line 502 shown in FIG. 5 of the optical information reproducing apparatus may be obtained and stored in the storage unit 18. In the case of the above configuration, the accuracy of the estimation setting is improved as compared to the case of uniformly using the inclination of the straight line 501.

Although the optical information reproducing apparatus according to the present embodiment includes only one type of semiconductor laser, the present invention is not limited thereto. The optical information reproducing apparatus may also include a plurality of semiconductor lasers to emit laser beams with different wavelengths (for example, about 650 nm or about 780 nm).

Alternatively, the parameters of the high-frequency current may be switched based on the type of the optical disc 1 and the reproduction speed only in the semiconductor laser operating at a wavelength of 405 nm, and the parameters of the high-frequency current may be fixed in semiconductor lasers operating at other wavelengths.

VIII. Next, the operation when the parameters of the high-frequency current are determined based on which information recording surface is reproduced when the optical disc 1 has a plurality of information recording surfaces will be described.

Here, the magnitude of the reference drive current is determined in advance at least based on the reproduction layer information indicating which information recording surface is reproduced when the optical disc 1 has a plurality of information recording surfaces. For example, the laser output is set to be larger when an information recording surface at a position far from the laser beam incident surface of the optical disc 1 is employed than when an information recording surface at a position near to the incident surface is employed.

As described above, when the parameters of the high-frequency current are determined, the parameters of the high-frequency current are set such that the ratio of the peak level value and the average level value of the light intensity of the laser beam (the peak level value/the average level value) is equal to or less than a predetermined threshold value.

However, in the case of using the multi-layered optical disc, the deterioration of reproduction light occurs more easily than in the case of using a single-layered optical disc. Thus, the peak level value/the average level value needs to be made smaller than that in the above case.

Meanwhile, when the laser output is large, the influence of noise due to the return light to the laser is small. Thus, jitter occurrence due to the noise is suppressed.

Accordingly, to prevent the deterioration of reproduction light, the peak level value/the average level value needs to be set to be smaller in the case of reproducing the information recording surface at a far position than in the case of reproducing the information recording surface at a near position. To be more specific, it is preferable to reduce the high-frequency current to be superimposed, for example, by supplying only the reference drive current on which the high-frequency current is not superimposed to the semiconductor laser 6 when an information recording surface at the farthest position is reproduced. Accordingly, the parameters of the high-frequency current include the case in which the frequency is 0.

With the above configuration, the parameters of the high-frequency current are determined based on which information recording surface is to be reproduced out of the plurality of information recording surfaces of the multi-layered disc. Thus, the deterioration of reproduction light can be prevented, and the jitter can be also suppressed.

IX. Next, the operation when the information recording surfaces to be reproduced are changed in the case where the optical disc 1 has a plurality of information recording surfaces will be described.

It is preferable to change the parameters of the high-frequency current according to the characteristics of each information recording surface even when the plurality of information recording surfaces are reproduced at the same wavelength and by a lens with the same NA.

Generally, when the information recording surfaces to be reproduced are changed, the objective lens 13 is moved to change the light collecting surfaces of the laser beam, and the collimator lens 11 is moved to correct spherical aberration. In the present embodiment, the parameters of the high-frequency current are also changed.

The parameters of the high-frequency current with respect to each information recording surface to be reproduced are stored in advance in the storage unit 18 in addition to the type of the optical disc 1 and the reproduction speed.

When the information recording surfaces to be reproduced are changed, the control unit 5 compares the parameters of the high-frequency current corresponding to the information recording surface being reproduced and the parameters of the high-frequency current corresponding to the information recording surface after the change (step 301).

In a case in which a smaller peak level value is obtained in the light intensity by the parameters of the high-frequency current corresponding to the information recording surface after the change (for example, the high frequency superimposition amplitude value is smaller), the parameters of the high-frequency current are changed first (step 302). Subsequently, the objective lens 13 and the collimator lens 11 are moved (step 303).

Accordingly, the peak level value of the light intensity is suppressed to a level at which the deterioration of reproduction light does not occur when the laser beam is collected on the information recording surface after the change. The highly reliable optical information reproducing apparatus can be thereby provided.

In a case in which a larger peak level is obtained in the light intensity by the parameters of the high-frequency current corresponding to the information recording surface after the change, the objective lens 13 and the collimator lens 11 are moved first (step 304). Subsequently, the parameters of the high-frequency current are changed (step 305).

Accordingly, the information recording surfaces can be changed without irradiating the information recording surface before the change with a laser beam with a peak level at which the deterioration of reproduction light occurs. The highly reliable optical information reproducing apparatus can be thereby provided.

The storage unit 18 may be provided within the optical pickup 3.

Although the case in which the jitter is optimized at the same time as preventing the deterioration of reproduction light is described in the aforementioned embodiment, the present invention is not limited thereto. For example, the jitter may not be necessarily optimized. That is, it is only necessary to suppress the deterioration of reproduction light and suppress the jitter.

Although the case in which the parameters of the high-frequency current are determined according to both the type of the optical disc and the reproduction speed is described in the aforementioned embodiment, the present invention is not limited thereto. For example, the parameters of the high-frequency current may be determined according to one of the type of the optical disc and the reproduction speed. In this case, the deterioration of reproduction light can be also suppressed as compared to a conventional case.

Although the case in which the parameters of the high-frequency current are determined according to the information recording surface to be reproduced in the optical disc having a plurality of information recording surfaces is described in the aforementioned embodiment, the present invention is not limited thereto. For example, the parameters of the high-frequency current may be determined by also taking at least one of the type of the optical disc and the reproduction speed into consideration.

Although the case in which the parameters of the high-frequency current are changed according to the change in reproduction speed, or the selected information recording surface to be reproduced is described as an example of changing the parameters of the high-frequency current during reproduction in the aforementioned embodiment, the present invention is not limited thereto. For example, the parameters of the high-frequency current may be changed according to both the change in reproduction speed, and the selected information recording surface to be reproduced.

Although the case in which the set value data set by estimation (for example, proportional calculation) is stored in the storage unit 18 and the stored estimated set value is subsequently used is described in the aforementioned embodiment, the present invention is not limited thereto. For example, the set value may be set by estimation each time reproduction operation is performed.

In addition, the program according to the present invention is a program for causing a computer to execute the function of a control unit of an optical information reproducing apparatus of the present invention described above, and is a program which operates in collaboration with the computer.

In addition, the program according to the present invention is a program for causing a computer to execute the operation of step, in which a parameter of said high-frequency current is determined, of the information reproducing method of the optical information reproducing apparatus of the present invention described above, and may be a program which operates in collaboration with the computer.

Moreover, the recording medium of the present invention is a recording medium which holds a program for causing a computer to execute the function of a control unit of an optical information reproducing apparatus of the present invention described above, and may be a recording medium for the above-mentioned program being readable by a computer and executing the above-mentioned operation with collaborating with the above-mentioned computer.

Moreover, the recording medium of the present invention is a recording medium which records a program for causing a computer to execute operation of the step, in which a parameter of said high-frequency current is determined, of the information reproducing method of the optical information reproducing apparatus of the present invention described above, and may be a recording medium for the above-mentioned program being readable by a computer and executing the above-mentioned operation with collaborating with the above-mentioned computer.

In addition, one utilizing form of the program of the present invention may be an aspect of being recorded on a recording medium, ROM and the like are included, which can be read by a computer, and operating with collaborating with the computer.

Moreover, one utilizing form of the program of the present invention may be an aspect of being transmitted inside a transmission medium, transmission media such as the Internet, light, radio waves, and acoustic waves and the like are included, being read by a computer, and operating with collaborating with the computer.

Furthermore, a computer according to the present invention described above is not limited to pure hardware such as a CPU and may be arranged to include firmware, an OS and, furthermore, peripheral devices.

Moreover, as described above, configurations of the present invention may either be realized through software or through hardware.

Industrial Applicability

An optical information reproducing apparatus, an information reproducing method of an optical information reproducing apparatus, a program and a recording medium according to the present invention can prevent the deterioration of reproduction light and is suitable for a reproduction system of the optical disc on which information is recorded in high-density, and the like.

DESCRIPTION OF SYMBOLS

1 optical disc
2 spindle motor
3 optical pickup
4 signal processing unit
5 control unit
6 semiconductor laser
7 laser drive unit
8 front light beam splitter
9 front light monitor
10 beam splitter
11 collimator lens
12 rising mirror
13 objective lens
14 optical detector
15 current control unit
16 D/A converter
17 Oscillator
18 storage unit
31 curve line (characteristic curve line of the value of the peak level value/the average level value which is used for explaining in case of reproduction performed at a double speed)
32 curve line (characteristic curve line of the value of the peak level value/the average level value which is used for explaining in case of reproduction performed at a quadruple speed)
33 curve line (characteristic curve line of the value of the peak level value/the average level value which is used for explaining in case of change of the high frequency superimposition frequency)

The invention claimed is:

1. An optical information reproducing apparatus which irradiates a laser beam to an information recording medium and reads an information, said optical information reproducing apparatus comprising:
   a semiconductor laser which generates said laser beam;
   a laser drive unit which supplies a drive current on which a high-frequency current is superimposed to said semiconductor laser;
   a spindle motor which drives said information recording medium; and
   a control unit which controls said laser drive unit and said spindle motor,
   wherein said control unit determines a parameter of said high-frequency current based on magnitude of a current on which said high-frequency current is to be superimposed,
   said magnitude of said current on which said high-frequency current is to be superimposed is determined based on reproduction layer information indicating which one of information recording surfaces on said information recording medium is reproduced,
   said parameter of said high-frequency current is determined so that a ratio of a peak level value and an average level value of a light intensity of said laser beam (a peak level value/a average level value) is smaller in the case of reproducing an information recording surface at the farthest position from an incident surface of said laser beam than in the case of reproducing an information recording surface at the nearest position from said incident surface of said laser beam.

2. The optical information reproducing apparatus according to claim 1,
wherein in the case of reproducing said information recording surface at the farthest position from said incident surface of said laser beam, only a reference drive current on which said high-frequency current is not superimposed is supplied to said semiconductor laser.

3. The optical information reproducing apparatus according to claim 2,
wherein said parameter of said high-frequency current includes an amplitude set value which sets an amplitude value of said high-frequency current and a frequency set value which sets a frequency of said high-frequency current, which are used at said laser drive unit.

4. The optical information reproducing apparatus according to claim 3,
wherein said parameter of said high-frequency current is set so that said ratio of said peak level value and said average level value of said light intensity of said laser beam is equal to or less than a predetermined value.

5. The optical information reproducing apparatus according to claim 4,
wherein said predetermined value is a threshold value which does not cause damage to recorded information on said information recording medium by said laser beam when said information recording medium is reproduced.

6. The optical information reproducing apparatus according to claim 5,
wherein said predetermined value differs depending on which information recording surface of said information recording medium is reproduced.

7. An information reproducing method of an optical information reproducing apparatus which irradiates a laser beam to an information recording medium and reads an information, said optical information reproducing apparatus having:
(i) a semiconductor laser which generates said laser beam;
(ii) a laser drive unit which supplies a drive current on which a high-frequency current is superimposed to said semiconductor laser;
(iii) a spindle motor which drives said information recording medium; and
(iv) a control unit which controls said laser drive unit and said spindle motor,
wherein said information reproducing method comprises:
a step in which said control unit determines a parameter of said high-frequency current based on magnitude of a current on which said high-frequency current is to be superimposed,
said magnitude of said current on which said high-frequency current is to be superimposed is determined based on reproduction layer information indicating which one of information recording surfaces on said information recording medium is reproduced,
said parameter of said high-frequency current is determined so that a ratio of a peak level value and an average level value of a light intensity of said laser beam (a peak level value/a average level value) is smaller in the case of reproducing an information recording surface at the farthest position from an incident surface of said laser beam than in the case of reproducing an information recording surface at the nearest position from said incident surface of said laser beam.

8. The information reproducing method of an optical information reproducing apparatus according to claim 7,
wherein in the case of reproducing said information recording surface at the farthest position from said incident surface of said laser beam, only a reference drive current on which said high-frequency current is not superimposed is supplied to said semiconductor laser.

9. The information reproducing method of an optical information reproducing apparatus according to claim 8,
wherein said parameter of said high-frequency current includes an amplitude set value which sets an amplitude value of said high-frequency current and a frequency set value which sets a frequency of said high-frequency current, which are used at said laser drive unit.

10. The information reproducing method of an optical information reproducing apparatus according to claim 9,
wherein said parameter of said high-frequency current is set so that said ratio of said peak level value and said average level value of said light intensity of said laser beam is equal to or less than a predetermined value.

11. The information reproducing method of an optical information reproducing apparatus according to claim 10,
wherein said predetermined value is a threshold value which does not cause damage to recorded information on said information recording medium by said laser beam when said information recording medium is reproduced.

12. The information reproducing method of an optical information reproducing apparatus according to claim 11,
wherein said predetermined value differs depending on which information recording surface of said information recording medium is reproduced.

* * * * *